United States Patent [19]

Finke et al.

[11] Patent Number: 4,843,139

[45] Date of Patent: Jun. 27, 1989

[54] MOLDABLE HIGH MOLECULAR WEIGHT AROMATIC POLYAMIDE FROM POLY ARYLENE OXY DIAMINE

[75] Inventors: Juergen Finke, Marl; Martin Bartmann, Recklinghausen, both of Fed. Rep. of Germany

[73] Assignee: Huels Aktiengesellschaft, Marl, Fed. Rep. of Germany

[21] Appl. No.: 205,355

[22] Filed: Jun. 10, 1988

[30] Foreign Application Priority Data

Sep. 17, 1987 [DE] Fed. Rep. of Germany ....... 3731185

[51] Int. Cl.$^4$ .............................................. C08G 63/28
[52] U.S. Cl. ...................................... 528/125; 528/126
[58] Field of Search ................................ 528/125, 126

[56] References Cited

U.S. PATENT DOCUMENTS 4,754,016 6/1988 Ai et al. .............................. 528/125

Primary Examiner—Harold D. Anderson
Assistant Examiner—T. Mason
Attorney, Agent, or Firm—Oblon, Fisher, Spivak, McClelland & Maier

[57] ABSTRACT

A high molecular weight aromatic polyamide molding composition prepared by the polycondensation reaction of:
(A) An aromatic diamine of the formula:

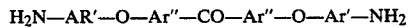

wherein Ar' and Ar" are meta- or para-phenylene, and wherein up to 70 mole % of said aromatic diamine can be replaced by a second aromatic diamine having the formula:

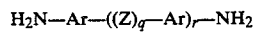

wherein Ar is meta- or para-phenylene, Z is identical or different radicals selected from the group consisting of —O—, —S—, —SO$_2$—, —CO—, and —C(CH$_3$)$_2$—, q is 0 or 1, and r is 0, 1 or 2, with
(B) An aromatic dicarboxylic acid selected from the group consisting of:
  (i) isophthalic acid, wherein up to 60 mole % of said isophthalic acid may be replaced with terephthalic acid, wherein said isophthalic acid and said terephthalic acid may be ring substituted with one or more substituents selected from the group consisting of C$_{1-6}$ alkyl, phenyl, alkyl or aryl substituted phenyl, C$_{1-6}$ alkoxy, phenoxy, alkyl or aryl substituted phenoxy and halogen substituents;
  (ii) a dicarboxylic acid of the formula

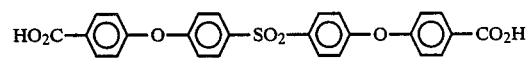

(iii) a dicarboxylic acid of the formula:

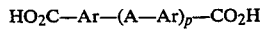

wherein Ar is meta- or para-phenylene, A is —O—, —S—, —SO$_2$—, or —CO—, and p is 0 or 1; and mixtures thereof.

11 Claims, No Drawings

MOLDABLE HIGH MOLECULAR WEIGHT AROMATIC POLYAMIDE FROM POLY ARYLENE OXY DIAMINE

BACKGROUND OF THE INVENTION

1. Field of the Invention

The invention relates to high molecular weight aromatic polyamides and a process for preparing them.

2. Discussion of the Background

Aromatic polyamides with the repeating unit

—CO—Ar—CO—NH—Ar'—X—Ar''—Y—Ar''—X—Ar'—NH— are distinguished not only by high temperature resistance and good mechanical properties; they can also be processed thermoplastically (Elias/Vohwinkel, "New polymeric materials for industrial use", 2nd Edition, Carl Hansor Verlag 1983, pages 242 ff.). In this formula, X stands for an ether oxygen and Y for a carbonyl group, and Ar, Ar', and Ar'', independently of one another, stand for the p- and m-phenylene groups.

Aromatic polyamides can also be prepared by the reaction of aromatic dicarboxylic acids with aromatic diisocyanates (DE-OS 19 28 435) and by reacting diaryl esters of aromatic dicarboxylic acids with aromatic diamines.

Processes are known in which aromatic polyamides are obtained directly by the reaction of aromatic dicarboxylic acids and aromatic diamines in the presence of aromatic phosphites. Solvents that have proved useful for this process are N-methylamides, especially N-methylpyrrolidone. On the other hand, no polymeric amides are obtained with other dipolar aprotic solvents such as dimethyl sulfoxide (see F. Higashi et al., J. Polym., Sci., Polym. Chem. Ed 18, 1711 ff. (1980)).

A summary provided in S. M. Aharoni et al., J. Polym. Sci., Polym. Chem. Ed. 22, 2579 (1984) teaches that (1) the phosphite used has to contain aryl groups and is preferably triphenyl phosphite; (2) the aryl phosphites have to be used in at least an amount such that for every 1 mole of amide to be converted there is 1 mole of a compound with the group

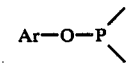

since this group is consumed during the reaction and this reaction represents the driving force of the conversion; and (3) pyridine is not necessary for the reaction, but at the same time it has an accelerating effect on the course of the reaction.

Besides these processes in which the condensation is carried out in a solvent, there have also been attempts to prepare polyamides in the melt. Thus, U.S. Pat. No. 3,109,836 describes a process for preparing polyamides with the repeating unit (CO—Ar—NH) that consists of heating acetamidobenzoic acid for 3 hours under vacuum at 200° to 300° C. Contrary to the claims in this document, this process does not provide thermoplastically processable products, since the melting points of the reaction products are in the range of the temperature of decomposition or above.

It has also been proposed to prepare aromatic polyamides by transamidation of acylated aromatic amines in the melt. Aside from the fact that such a procedure would require the prior preparation of the acylated amines, the results obtained by this procedure are still considered to be very unsatisfactory. To improve the processability, pure aromatic starting materials were not used, but mixtures with aliphatic compounds. The diamines are not completely but only partially acylated. Finally, acetic acid, acetic anhydride, dimethylacetamide or another agent is added to the reaction melt to improve the flowability. See Keske et al., Polymer Prepr., 25, Part XXV, p. 25 (1984) and U.S. Pat. No. 3,654,227.

As pointed out in the monograph by Buhler "Special Plastics", Akademieverlag, Berlin (1978), on page 412, the method of melt polycondensation cannot be applied to the preparation of aromatic polyamides from aromatic dicarboxylic acids and simple aromatic diamines.

SUMMARY OF THE INVENTION

Accordingly, one object of the present invention is to provide a process for preparing aromatic polyamides using only a melt polycondensation process.

A further object of the invention is to prepare novel aromatic polyamides by melt polymerization.

These and other objects which will become apparent from the following specification have been achieved by the present high molecular weight aromatic polyamide molding compositions which are prepared by the polycondensation of:

(A) An aromatic diamine of the formula:

$$H_2N—Ar'—O—Ar''—CO—Ar''—O—Ar'—NH_2$$

where Ar' and Ar'' are meta- or para-phenylene, and where up to 70 mole % of the aromatic diamine can be replaced by a second aromatic diamine having the formula:

$$H_2N—Ar—((Z)_q—Ar)_r—NH_2$$

where Ar is meta- or para-phenylene, Z is identical or different radicals selected from the group consisting of —O—, —S—, —SO$_2$—, —CO—, and —C(CH$_3$)$_2$—, q is 0 or 1, and r is 0, 1 or 2, with (B) An aromatic dicarboxylic acid selected from the group consisting of:

(i) isophthalic acid, wherein up to 60 mole % of the isophthalic acid may be replaced with terephthalic acid, and the isophthalic acid and terephthalic acid may be ring substituted with one or more substituents selected from the group consisting of C$_{1-6}$ alkyl, phenyl, alkyl or aryl substituted phenyl, C$_{1-6}$ alkoxy, phenoxy, alkyl or aryl substituted phenoxy and halogen substituents;

(ii) a dicarboxylic acid of the formula

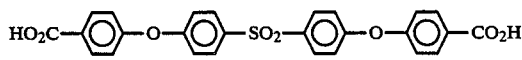

(iii) a dicarboxylic acid of the formula:

$$HO_2C—Ar—(A—Ar)_p—CO_2H$$

where Ar is meta- or para-phenylene, A is —O—, —S—, —SO$_2$—, or —CO—, and p is 0 or 1; and mixtures of (i), (ii), and (iii).

DETAILED DESCRIPTION OF THE PREFERRED EMBODIMENTS

A process has now been found by which certain aromatic diamines can be reacted directly with aromatic dicarboxylic acids in the melt to obtain polyamides. Astonishingly, the new products are not only thermoplastically processable, but they are also insoluble in polar, high-boiling solvents such as N-methylpyrrolidone, m-cresol, sulfolane, dimethyl sulfoxide, and similar solvents.

The present process for preparing the polyamides consists of reacting an approximately equimolar mixture of the aromatic dicarboxylic acid and the aromatic diamines in the presence of at least a catalytically effective amount of triphenyl phosphite or of an acid derived from phosphorus having the formula $H_3PO_n$ where n is 2, 3 or 4 or a catalytically effective amount of a mixture of the phosphorus compounds mentioned and a 4-dialkylaminopyridine, in the melt at temperatures between about 200° and 400° C.

The addition of the small amount of cocatalyst, i.e. the dialkylaminopyridine, has a very substantial effect on the formation of the polyamide, in that the molecular weight is substantially increased, the color quality of the polymer is distinctly improved and the time for polycondensation is drastically reduced.

The following aromatic dicarboxylic acids or their mixtures can be used in accordance with the invention:

(i) Isophthalic acid that can be replaced by up to 60 mole % terephthalic acid, in which both acids can be mono- or polysubstituted by the following groups:
  (a) $C_{1-6}$ alkyl
  (b) optionally alkyl-, preferably $C_{1-6}$ alkyl, or aryl-substituted phenyl group
  (c) alkoxy groups with 1-6 carbon atoms
  (d) phenoxy groups, in which the phenyl ring in turn can be alkyl-, preferably $C_{1-6}$ alkyl, or aryl-substituted
  (e) halogen, especially chlorine and bromine, (ii) a dicarboxylic acid of the formula:

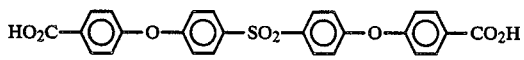

(See Lorenz et al. Makromolekulare Chemie 130, 65 (1969), (iii) and a dicarboxylic acid of the general formula:

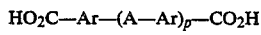

where Ar is m-phenylene or p-phenylene; A is —O—, —S—, —SO₂—, or SO; and p is 0 or 1.

The following aromatic diamines or their mixtures may be used in accordance with the invention:

in which Ar' and Ar" stand for m- or preferably p-phenylene groups, especially 4,4'-bis(4-aminophenoxy)benzophenone, which is obtained by reacting p-aminophenol with 4,4'-difluorobenzophenone.

Up to 70 mole % of the diamines mentioned above may be replaced by aromatic diamines of the general formula:

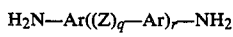

wherein Ar is m-phenylene, p-phenylene; Z is identical or different radicals from the group consisting of —O—, —S—, —SO₂—, —CO—, and —C(CH₃)₂—; q=0 or 1; and r=0, 1, or 2.

0.95 to 1.05 mole, preferably 1.0 mole, of aromatic dicarboxylic acid is used based on 1 mole of aromatic diamines.

The reaction of the aromatic dicarboxylic acids with the diamines is carried out in the presence of a catalytic amount of a compound containing phosphorus or in the presence of a catalytic amount of a mixture of this compound containing phosphorus and a 4-dialkylaminopyridine. Preferred compounds containing phosphorus include triphenyl phosphite, hypophosphorous acid, phosphorous acid, and phosphoric acid.

The 4-dialkylaminopyridines used as a cocatalysts have the structure

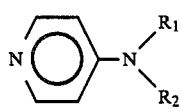

in which $R_1$ and $R_2$ either stand for a $C_{1-10}$ alkyl group independently of one another or can form a pyrrolidine or piperidine ring together with the amino nitrogen. Preferred compounds are 4-dimethylaminopyridine, 4-dibutylaminopyridine, 4-di-n-hexylaminopyridine, and 4-piperidinylpyridine. The pyridine derivatives can be prepared in accordance with Synthesis, (1978), 844.

High-boiling organic bases with tertiary nitrogen atoms, such as isoquinoline or quinoline, as well as inorganic basic salts, especially alkali metal and alkaline earth carbonates such as calcium carbonate, can also be used as the cocatalyst.

Based on 100 moles of dicarboxylic acid used, 0.1 to 10 moles, preferably 1-5 moles of the compound containing phosphorus and of the cocatalyst are used in each case.

Ordinarily, the procedure is carried out under inert gas at normal pressure. However, if it should be desirable for any reason, it can also be carried out with slight overpressure or underpressure. The times necessary to produce products with adequately high molecular weights are between 1 and 4 hours.

The polycondensation is carried out in the melt at temperatures between about 200° and 400° C., preferably 250° to 350° C. There are three embodiments in particular by which the process can be carried out:

I. The reactants and the catalysts are melted together and precondensed at temperatures between about 200° and 250° C. The temperature is then raised to a maximum of 350° to 400° C. and the prepolymer is post-condensed. The buildup of molecular weight that takes place can be recognized from the sharp increase of the melt viscosity.

II. A powdered mixture of reactants and catalysts is treated in a kneader while gradually raising the temperature from about 220° to 380° C. until the water formed during the condensation is eliminated. Alternatively, it is also possible to carry out the polycondensation in an extruder. In this case also, the apparatus is loaded with a powdered mixture of the components, and complete elimination of the water of reaction is provided for by suitable temperature adjustment.

III. Finally, it is also possible to react the starting materials initially in accordance with Embodiment I at a temperature of about 200° to 280° C. to form a precondensate, and then to post-condense the precondensate in a kneader or in an extruder. Temperatures of about 280° to 400° C., preferably 290° to 380° C., are then ordinarily necessary in the extruder. This embodiment is particularly preferred.

If the end product should still have an inadequately high molecular weight, it is possible to produce an increase in the molecular weight by solidphase post-condensation. Such a procedure is familiar to one skilled in the art.

To prepare products with adequately high molecular weights, it is necessary to remove the water formed during the polycondensation from the reaction system. According to Embodiment I, it is sufficient for this purpose to pass inert gas over or through the mixture. However, vacuum can also be applied.

At the end of the polycondensation, a more or less viscous melt of the polymer is obtained which can be possessed further to obtain a granulate. The products formed can be processed into molded parts by pressing at elevated temperature (>200° C.).

Other features of the invention will become apparent in the course of the following descriptions of exemplary embodiments which are given for illustration of the invention and are not intended to be limiting thereof.

EXAMPLES

Example 1

In a polycondensation reactor with stirrer, nitrogen inlet, and distillation bridge, 9.91 g (0.025 mole) of 4,4-bis(4-aminophenoxy)benzophenone and 4.15 g (0.025 mole) of isophthalic acid were melted under nitrogen with 0.1 ml of 50wt.% aqueous hypophosphorous acid and 0.12 g of 4-dimethylaminopyridine at 250° C. The melt was stirred for 20 minutes with continuous elimination of water. The temperature was then raised to 300° C. and the stirring was continued for 5 minutes longer. The product was insoluble and showed a glass transition temperature of 235° C.

Example 2

Similarly to Example 1, 9.91 g (0.025 mole) of 4,4'-bis(4-aminophenoxy)benzophenone, 2.49 g (0.015 mole) of isophthalic acid, and 1.66 g (0.01 mole) of terephthalic acid were reacted with 0.1 ml of 50 wt.% aqueous hypophosphorous acid and 0.12 g of 4-dimethylaminopyridine. The glass temperature was 240° C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high molecular weight moldable aromatic polyamide of:
   (A) An aromatic diamine of the formula:

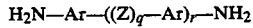

H$_2$N—Ar'—O—Ar''—CO—Ar''—O—Ar'—NH$_2$ wherein Ar' and Ar'' are meta- or para-phenylene, or a mixture thereof with up to 70 mole % of a second aromatic diamine having the formula:

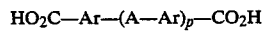

H$_2$N—Ar—((Z)$_q$—Ar)$_r$—NH$_2$ wherein Ar is meta- or para-phenylene, Z is identical or different radicals selected from the group consisting of —O—, —S—, —SO$_2$—, —CO—, and —C(CH$_3$)$_2$—, q is 0 or 1, and r is 0, 1 or 2, with
   (B) An aromatic dicarboxylic acid selected from the group consisting of:
   (i) isophthalic acid, or a mixture thereof with up to 60 mole % of terephthalic acid, wherein said isophthalic acid and said terephthalic acid are unsubstituted or are ring substituted with one or more substituents selected from the group consisting of C$_{1-6}$ alkyl, phenyl, alkyl or aryl substituted phenyl, C$_{1-6}$ alkoxy, phenoxy, alkyl or aryl substituted phenoxy and halogen substituents;
   (ii) a dicarboxylic acid of the formula

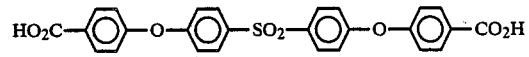

(iii) a dicarboxylic acid of the formula:

HO$_2$C—Ar—(A—Ar)$_p$—CO$_2$H wherein Ar is meta- or para-phenylene, A is —O—, —S—, —SO$_2$—, or —CO—, and p is 0 or 1; and mixtures of (i), (ii) and (iii).

2. The molding composition of claim 1, wherein said aromatic diamine comprises 4,4'-bis(4-amino-phenoxy)-benzophenone.

3. The molding composition of claim 1, wherein said aromatic dicarboxylic acid comprises isophthalic acid.

4. The moldable aromatic polyamide of claim 1, prepared by a polycondensation reaction conducted in the presence of a catalytically effective amount of a catalyst which is triphenyl phosphite or an acid derived from phosphorous having the formula H$_3$PO$_n$, wherein n is 2, 3 or 4, or mixtures thereof with a 4-dialkylaminopyridine.

5. The moldable polyamide of claim 4, wherein the catalyst is a catalytically effective amount of a mixture of hypophosphorous acid and 4-dimethylaminopyridine.

6. A process for preparing a high molecular weight polyamide, comprising condensing an aromatic diamine and an aromatic dicarboxylic acid in the melt at temperatures between about 200°–400° C. in the presence of a catalytic amount of a catalyst comprising triphenyl phosphite or an acid derived from phosphorous with the formula H$_3$PO$_n$ wherein n is 2, 3 or 4, and wherein said aromatic diamine has the formula

H$_2$N—Ar'—O—Ar''—CO—Ar''—O—Ar'—NH$_2$ wherein Ar' and Ar'' are meta- or para-phenylene, or a mixture thereof with up to 70 mol% of a second aromatic diamine having the formula:

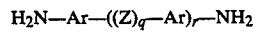

H$_2$N—Ar—((Z)$_q$—Ar)$_r$—NH$_2$ wherein Ar is meta- or para-phenylene, Z is identical or different radicals selected from the group consisting of —O—, —S—, —SO$_2$—, —CO—, and —C(CH$_3$)$_2$—, q is 0 or 1, and r is 0, 1 or 2; and wherein

said aromatic dicarboxylic acid is selected from the group consisting of:
(i) isophthalic acid, or a mixture thereof with up to 60 mole % of terephthalic acid, wherein said isophthalic acid and said terephthalic acid are unsubstituted or are ring substituted with one or more substituents selected from the group consisting of $C_{1-6}$ alkyl, phenyl, alkyl or aryl substituted phenyl, $C_{1-6}$ alkoxy, phenoxy, alkyl or aryl substituted phenoxy and halogen substituents;
(ii) a dicarboxylic acid of the formula

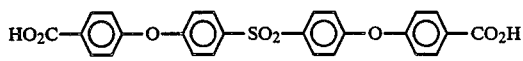

(iii) a dicarboxylic acid of the formula:

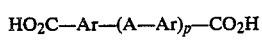

wherein Ar is meta- or para-phenylene, A is —O—, —S—, —$SO_2$—, or —CO—, and p is 0 or 1; and mixtures of (i), (ii) and (iii).

7. The process of claim 6, wherein said aromatic diamine is 4,4'-bis(4-aminophenoxy)benzophenone.

8. The process of claim 6, wherein said aromatic dicarboxylic acid is isophthalic acid.

9. The process of claim 6, wherein a cocatalyst comprising a 4-dialkylaminopyridine, a high-boiling organic base containing a tertiary nitrogen atom, or an inorganic basic salt is added to said catalyst.

10. The process of claim 6, wherein said melt condensation is carried out in two steps, with the temperature in the first step being in the range up to 250° C., and the temperature in the second step being above 280° C.

11. The process of claim 10, wherein said second step is carried out in a kneader or extruder.

* * * * *